2,941,934
POLYMERIZATION BY TEMPERATURE CONTROLLED IRRADIATION

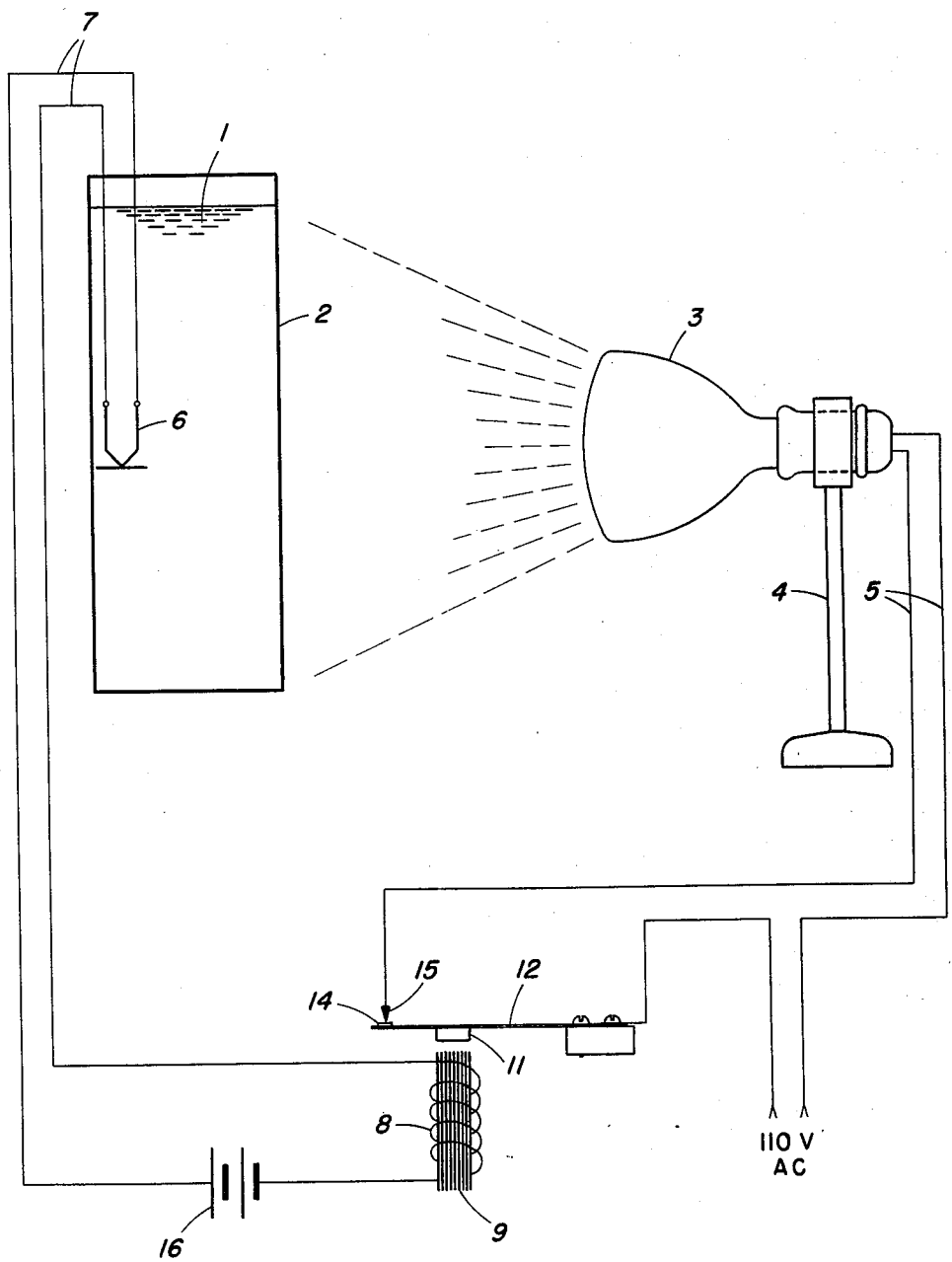

Harry D. Anspon, Easton, and Frank E. Pschorr, Phoenixville, Pa., assignors to General Aniline & Film Corporation, New York, N.Y., a corporation of Delaware Filed Jan. 16, 1957, Ser. No. 634,535

2 Claims. (Cl. 204—158)

The invention here presented is a new and useful procedure for the polymerization of radiation-sensitive materials by the use of a temperature sensitive member associated with the polymerizate to control the amount and duration of polymerizing radiation applied thereto.

In the polymerizing of many monomers, particularly α-chloroacrylate esters, acrylate esters, methacrylate esters and the like by the application thereto of radiation, especially ultraviolet light, or γ-rays, or X-ray, considerable difficulty has been encountered. If the body of monomer is quite thin, so that the ratio of mass to surface area is not too large, the polymerization can be conducted by continuous application of the desired radiation energy. However, if the thickness is more than a small fraction of an inch, the amount of heat liberated by the polymerization reaction is greater than can be dissipated from the available surface area, with the result that the monomer body overheats and the polymerization may run away, resulting in defective polymer, or the monomer may boil, yielding bubbles, blisters and the like, or the monomer may be actually depolymerized and even decomposed, even to the extent of charring. These facts have in the past sharply limited the thickness of polymerized bodies.

According to the present invention a polymerizable body of any desired size, shape, or thickness can be satisfactorily polymerized by the procedure of measuring the surface temperature of the body, and cutting off the polymerizing radiation whenever the surface temperature exceeds a critical amount, the polymerizing radiation then being turned on when the temperature has dropped to a safe value.

This is most easily accomplished by the use of a thermocouple to measure the temperature, connected to a relay which is actuated by the thermocouple to turn the light off and on as the temperature rises and falls, either by interruption of the current supply to the light, or by actuation of a shutter in the light path, or other means as desired; that is, if the thickness is such that the polymerization requires light for less than half the time, the lamp may be pivoted and rotated from one polymerizate mold to another thereby conserving light power. By this procedure, accurate control of the polymerization rate is obtained to limit the temperature rise to a safe value. Other objects and details of the invention will be apparent from the following description, when read in connection with the accompanying drawing wherein:

The single figure is a diagrammatic representation of the control system of the invention.

Referring to the drawings, the body of monomer 1, contained within an ultraviolet-transparent container 2, is positioned within the radiation angle of an ultraviolet light 3, carried upon a suitable stand 4, and energized from supply wires 5. A thermocouple junction 6 is positioned in operative relation to the body of monomer 1, preferably within the container 2, and connected by leads 7 to a relay coil 8, surrounding a relay core 9, having an armature member 11, mounted upon a spring 12, carrying contacts 14 and 15 which are connected in circuit with the wires 5 to lamps 3 to control the flow of current to the lamp. The thermocouple 6 and relay coil 8 are desirably energized by a battery or other sources of current 16.

As above pointed out, it has been discovered that if methyl α-chloroacrylate and the like are polymerized by constant irradiation, the exothermic heat generated during the polymerization frequently is sufficient to crack the glass plates of the molds used in the sheet casting of the polymer. If a large bulk polymerization of methyl α-chloroacrylate with constant irradiation is attempted, so much heat is generated that a violent foaming and bubbling occur at one stage of the polymerization. It has been found possible to carry out a successful polymerization of even large bulk castings of methyl α-chloroacrylate with irradiation, if this polymerization is carried out in such a manner that the irradiation may be instantaneously stopped when a critical temperature is attained.

It should be noted that tests made on these polymers show that the polymerization does not continue after the polymerizing light is turned off and accordingly the generation of heat ceases, thereby allowing the partially polymerized body to cool from the attained polymerization temperature, down toward room temperature and it is this property which makes the present process particularly useful.

The following examples are offered as the preferred method of practicing the invention; not as requiring any limitations upon the claims solicited.

EXAMPLE 1

Approximately 2 liters of methyl α-chloroacrylate monomer that had been steam distilled and then dried with silica gel were placed into a cellophane 3¼" I.D. sausage casing. The bottom of the casing had been sealed off with a tightly tied string and a mixture of gelatin and glycerine was placed inside to assure a perfect seal on the bottom. The monomer was poured into the sausage casing and then the casing was sealed off at the top with another string. The filled sausage casing, resting in a large test-tube, was so arranged that it was irradiated by six fluorescent (40 w., 110 v.) sun lamps. A thermocouple was placed about in the middle of the sausage casing, resting between the sausage casing and the glass test tube, and this thermocouple was connected to a cut-off relay, as shown above, which would automatically turn off the source of irradiation whenever the temperature was 5° above room temperature (30° C.). This arrangement made it possible to obtain a large bulk casting of methyl α-chloroacrylate polymer which had been virtually impossible to prepare using continuous lighting or using heat and a catalyst or ultraviolet light and a catalyst.

EXAMPLE 2

A 30 x 30 x ¼ glass casting cell was filled with methyl α-chloroacrylate that had been steam distilled and then dried with $P_2O_5$. The mold was irradiated with six fluorescent lamps from underneath the casting cell. A thermocouple was placed on the top of the mold which was connected to a cut-off relay to control the fluorescent lamps and shut them off when the temperature of the polymerization exceeded the room temperature by 6° C. This method of intermittent lighting made it possible to obtain a complete polymer sheet without loss of glass casting sheet due to overheating such as occurred when constant light irradiation was used.

EXAMPLE 3

Similar arrangements to those used in Examples 1 and 2 were prepared and irradiated by X-rays, similar thermocouple and relay control systems being provided to cut off current to the X-ray tube when the material in the cell reached the temperature approximately 6° above room temperature. In this instance also excellent castings were obtained without danger of overheating or other difficulties.

Thus the process of the invention enables workers in the polymerization art to obtain large castings of radiation-sensitive monomers without danger of overheating by the procedure of automatically interrupting the polymerizing light whenever the temperature reaches a dangerously high value.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. A polymerizing process comprising the steps in combination of applying a polymerizing radiation comprising an electrically energized source of radiation to a polymerizable monomer, measuring the polymerization reaction temperature of the polymerizing monomer, positively shutting off the radiation when the temperature reaches an undesirably high value and turning on the radiation when the temperature has fallen to a safe value.

2. The method of polymerizing methyl α-chloroacrylate monomer comprising steps in combination of pouring the monomer into an ultraviolet transparent mold, applying to the monomer in the mold an electrically generated ultraviolet light as a polymerizing agent, continuously measuring the polymerization reaction temperature during the polymerization reaction, positively shutting off the light when the temperature reaches a limiting top value and turning on the light when the temperature has fallen to a safe value.

References Cited in the file of this patent
UNITED STATES PATENTS

| | | |
|---|---|---|
| 2,525,664 | Gadsby | Oct. 10, 1950 |
| 2,622,205 | Miller et al. | Dec. 16, 1952 |
| 2,662,186 | Governale et al. | Dec. 8, 1953 |
| 2,666,025 | Nozaki | Jan. 12, 1954 |
| 2,690,423 | Moschel | Sept. 28, 1954 |